Jan. 10, 1939. T. MÜLLER ET AL 2,143,610
APPARATUS FOR TREATING SOLIDS WITH PHYSICAL AND CHEMICAL REACTANTS
Filed May 15, 1935
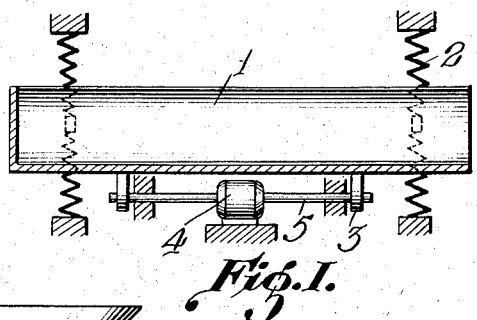
Fig. I.
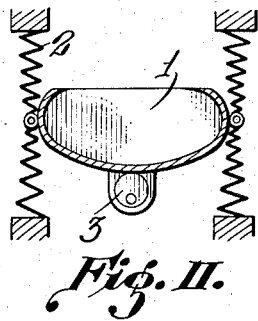
Fig. II.
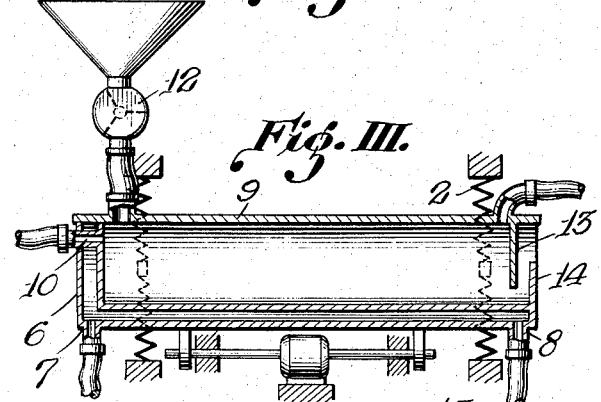
Fig. III.
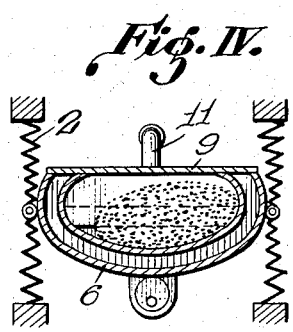
Fig. IV.
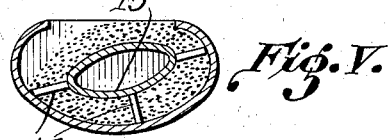
Fig. V.
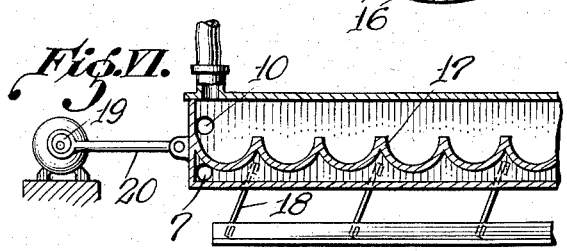
Fig. VI.
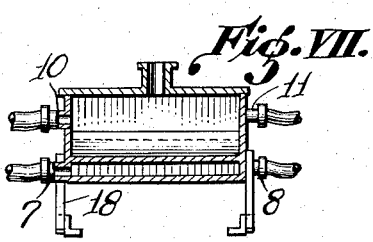
Fig. VII.
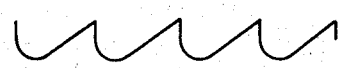
Fig. VIII
Fig. IX.
Fig. X.
Fig. XI.
Inventors:
Theodor Müller,
and Hermann Roelig,
by Potter, Pierce & Scheffler,
Attorneys.

Patented Jan. 10, 1939

2,143,610

UNITED STATES PATENT OFFICE 2,143,610

APPARATUS FOR TREATING SOLIDS WITH PHYSICAL AND CHEMICAL REACTANTS

Theodor Müller and Hermann Roelig, Leverkusen-I. G. Werk, Germany, assignors to I. G. Farbenindustrie Aktiengesellschaft, Frankfort-on-the-Main, Germany Application May 15, 1935, Serial No. 21,690
In Germany May 19, 1934

1 Claim. (Cl. 259—2)

This invention relates to an apparatus for treating solids with physical and chemical reactants; more particularly it relates to an apparatus consisting of at least one trough in which the solid to be treated is brought into intimate contact with a physical or chemical reactant by means of permanent vibrations, which vibrations simultaneously cause a constant turning over of the material in the trough or troughs.

In accordance with the present invention it has been found that the treatment of a solid material with a physical or chemical reactant is greatly facilitated if the material to be treated is subjected to vibrations. The process can be performed with vibrations of for instance 2000 to 5000 periods per minute and an amplitude of for instance 0.2 to 5 mm. Cyclic, elliptic or rectilinear vibrations may for example be applied. In this manner it is possible for instance to dry a moist material in a very short time by exposing the material to be dried to permanent vibrations and simultaneously treating it with a dry medium, for instance, dry air. It is also possible to calcine a product by vibrating it. In this case the calcination is effected in a shorter time than usually required. This method of working can successfully be used in cooling and heating a solid, or for mixing a solid material with other solid or liquid products. It can also be applied for treating a material with gases. In all cases the time for performing the treatment is shortened in comparison with the methods employed hitherto.

The new apparatus consists of at least one trough in which the material to be treated is deposited, and a device for vibrating the trough. This device may be a motor or any other vibration producing means, for instance, a magnetic-electric means which must be connected with the trough or troughs with a means transmitting the vibrations to the trough or troughs. A material brought into a vibration trough constantly turns round whereby every single particle of the material is brought into intimate contact with the physical or chemical reactant which is caused to interact with the material. The whole content of the trough is turned over but it is evident that the material forming the center is not brought into contact with the reactant as quickly as the outer particles of the material. In order to accelerate the operation it is possible to insert a core into the trough, for instance, a hollow iron plate core, so that the material to be reacted upon moves round this core. The core may be provided with heating or cooling means and also with distance pieces, for instance, rubber rings, so that during the process the same distance between the core and the trough is maintained. The core may be rigidly fixed to the walls of the troughs or it may be loosely inserted into the trough.

In accordance with a preferred feature of the invention a series of troughs is arranged in one line in such a manner that the solid material brought into the first trough is vibrated and simultaneously transported from the first trough into the second, third, etc. so that by the vibrations the material is not only turned over but is also transported. It is evident that the transport of the material can be accelerated or retarded by an appropriate inclination of the trough series.

In the accompanying drawing Figures I–V represent different modes of execution of the apparatus in longitudinal or cross section respectively, the apparatus consisting of a stretched trough. Figures VI and VII represent one mode of execution of the apparatus in longitudinal and cross section consisting of a series of troughs arranged in one line. Figures VIII and IX represent schematically different forms of troughs. Figures X and XI represent schematically some modes of execution of the apparatus wherein the troughs are formed by inserting partition walls of different kinds into a transport channel.

In particular Figures I and II show a longitudinal and cross section of a simple, open trough 1 which is elastically suspended by means of helical springs 2. The trough 1 is caused to vibrate cyclically by means of the eccentric 3 which is driven by the motor 4 by means of the connecting shafts 5. The feeding of the material to be treated into the apparatus can be performed by hand or by any appropriate apparatus. The withdrawal of the material performs automatically at the other end of the apparatus. In Figures III and IV a similar trough as shown in Figures I and II is illustrated provided with a heat exchanging jacket 6, which jacket is provided with a connecting pipe 7 for the introduction of the heat exchanging medium and a pipe 8 for its withdrawal. Furthermore the apparatus is covered by the cover 9 in order to allow the treatment of the material in the trough with a gaseous medium which is introduced into the apparatus by pipe 10, and withdrawn by pipe 11. With respect to the gas tightness of the apparatus the solid material must be fed into the apparatus by means of a sluice which is represented in Figure III by a bucket wheel 12. For the removal of the material also a sluice is to be provided, for instance, the siphon-like arranged walls 13 and 14. All connections are elastically arranged with respect to the vibrations of the apparatus, in the drawing this is represented by flexible hoses. Figure V illustrates a cross section of an apparatus as shown in Figure II in which an appropriate hollow core 15 is provided and held in distance from the walls of the apparatus by means of the distance pieces 16. If this core is loosely arranged in the trough it only replaces the slowly rotating center of the material, if the core is rigidly connected with the walls of the trough the vibration is transmitted also from the core to the material surrounding it. Figures VI and VII show in cross and longitudinal section a series of troughs 17 arranged in one line. The trough series 17 is arranged upon elastical rods 18 and vibrated by means of a vibration producing motor 19 and connecting rods 20 between motor and troughs.

We claim:—

An apparatus for treating solids with physical and chemical reactants comprising a series of substantially horizontal parallel troughs arranged side by side and in contact with each other and having their ends closed by walls which are higher than the side walls of the troughs so that material overflowing each trough will pass over a side wall thereof into the next adjoining trough of the series, means for feeding material to the first trough of the series, means for discharging material from the last trough of the series, and means for vibrating the series of troughs transversely to their longitudinal axes.

THEODOR MÜLLER.
HERMANN ROELIG.